US012046403B2

(12) United States Patent
Yen et al.

(10) Patent No.: US 12,046,403 B2
(45) Date of Patent: Jul. 23, 2024

(54) STACKED INDUCTOR DEVICE

(71) Applicant: Realtek Semiconductor Corporation, Hsinchu (TW)

(72) Inventors: Hsiao-Tsung Yen, Hsinchu (TW); Ka-Un Chan, Hsinchu (TW)

(73) Assignee: REALTEK SEMICONDUCTOR CORPORATION, Hsinchu (TW)

(*) Notice: Subject to any disclaimer, the term of this patent is extended or adjusted under 35 U.S.C. 154(b) by 925 days.

(21) Appl. No.: 17/035,914

(22) Filed: Sep. 29, 2020

(65) Prior Publication Data

US 2021/0350972 A1 Nov. 11, 2021

(30) Foreign Application Priority Data

May 11, 2020 (TW) ................................ 109115627

(51) Int. Cl.
*H01F 27/28* (2006.01)
*H01F 17/00* (2006.01)
*H01F 27/29* (2006.01)

(52) U.S. Cl.
CPC ..... *H01F 27/2804* (2013.01); *H01F 17/0006* (2013.01); *H01F 27/29* (2013.01);
(Continued)

(58) Field of Classification Search
CPC ............. H01F 27/2804; H01F 17/0006; H01F 2027/2809; H01F 17/0013; H01F 5/003;
(Continued)

(56) References Cited

U.S. PATENT DOCUMENTS 8,427,388 B2 * 4/2013 Fahs ........................ H01P 5/10
343/859
10,153,078 B2 12/2018 Yen et al.
(Continued)

FOREIGN PATENT DOCUMENTS

CN 110676028 A 1/2020
TW I591800 B 7/2017
(Continued)

OTHER PUBLICATIONS

SIPO, "1st CN Office Action and Search Report for CN Application No. 202010421479.1", China.

*Primary Examiner* — Tszfung J Chan
(74) *Attorney, Agent, or Firm* — Locke Lord LLP; Tim Tingkang Xia, Esq.

(57) ABSTRACT

A stacked inductor device including an 8-shaped inductor structure a stacked coil. The 8-shaped inductor structure includes a first coil and a second coil. The first coil is disposed in a first area. The first coil includes a first sub-coil and a second sub-coil, and the first sub-coil and the second sub-coil are disposed with an interval circularly with each other. The second coil is disposed in a second area, and the second coil is coupled with the first coil on a boundary between the first area and the second area. The second coil includes a third sub-coil and a fourth sub-coil, and the third sub-coil and the fourth sub-coil are disposed with an interval circularly with each other. The stacked coil is coupled to the first coil and the second coil and is stacked partially on or under the first coil and the second coil.

8 Claims, 8 Drawing Sheets

(52) U.S. Cl.
CPC ................ *H01F 2017/0073* (2013.01); *H01F 2027/2809* (2013.01); *H01F 2027/2819* (2013.01)

(58) Field of Classification Search
CPC . H01F 27/29; H01F 27/292; H01F 2017/0073
USPC ......................................... 336/200, 226, 232
See application file for complete search history.

(56) References Cited

U.S. PATENT DOCUMENTS

| | | | | |
|---|---|---|---|---|
| 2016/0035671 | A1* | 2/2016 | Huang | H01F 17/0006 336/200 |
| 2016/0094082 | A1* | 3/2016 | Ookawa | H01M 10/425 320/108 |
| 2017/0098500 | A1* | 4/2017 | Yen | H01F 27/29 |
| 2017/0200547 | A1* | 7/2017 | Yen | H01F 27/29 |
| 2018/0040412 | A1* | 2/2018 | Yen | H01F 17/0006 |
| 2018/0330872 | A1* | 11/2018 | Yen | H01F 27/2823 |
| 2019/0221350 | A1 | 7/2019 | Yen et al. | |

FOREIGN PATENT DOCUMENTS

| | | | | | |
|---|---|---|---|---|---|
| TW | 643216 | B1 * | 12/2018 | | H01F 17/0006 |
| TW | 645430 | B1 * | 12/2018 | | H01F 27/2804 |
| TW | I643217 | B | 12/2018 | | |

* cited by examiner

STACKED INDUCTOR DEVICE

CROSS-REFERENCE TO RELATED APPLICATION

This application claims priority to and the benefit of Taiwan Application Serial Number 109115627, filed on May 11, 2020, the entire content of which is incorporated herein by reference as if fully set forth below in its entirety and for all applicable purposes.

BACKGROUND

Field of Disclosure

The disclosure generally relates to electric devices, and more particularly, to inductor devices.

Description of Related Art

The various types of inductors according to the prior art have their advantages and disadvantages. For example, a spiral inductor has a higher Q value and a larger mutual inductance. However, its mutual inductance value and coupling are both occurred between the coils. For the 8-shaped inductor which has two sets of coils, the induced magnetic field of the two sets is inversed, and the coupling and the inductance value occur at another coupling magnetic field of another coil. Also, the 8-shaped inductor occupies a large area in a device. Therefore, the scopes of applications of the above-described inductors are limited.

SUMMARY

The disclosure can be more fully understood by reading the following detailed description of the embodiments, with reference made to the accompanying drawings as described below. It should be noted that the features in the drawings are not necessarily to scale. In fact, the dimensions of the features may be arbitrarily increased or decreased for clarity of discussion.

The present disclosure of an embodiment provides a stacked inductor device including an 8-shaped inductor structure a stacked coil. The 8-shaped inductor structure includes a first coil and a second coil. The first coil is disposed in a first area. The first coil includes a first sub-coil and a second sub-coil, and the first sub-coil and the second sub-coil are disposed with an interval circularly with each other. The second coil is disposed in a second area. The second coil is coupled with the first coil on a boundary between the first area and the second area. The second coil includes a third sub-coil and a fourth sub-coil, and the third sub-coil and the fourth sub-coil are disposed with an interval circularly with each other. The stacked coil is coupled to the first coil and the second coil and is stacked partially on or under the first coil and the second coil.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference made to the accompanying drawings as described below. It should be noted that the features in the drawings are not necessarily to scale. In fact, the dimensions of the features may be arbitrarily increased or decreased for clarity of discussion.

DETAILED DESCRIPTION

Figure 1:
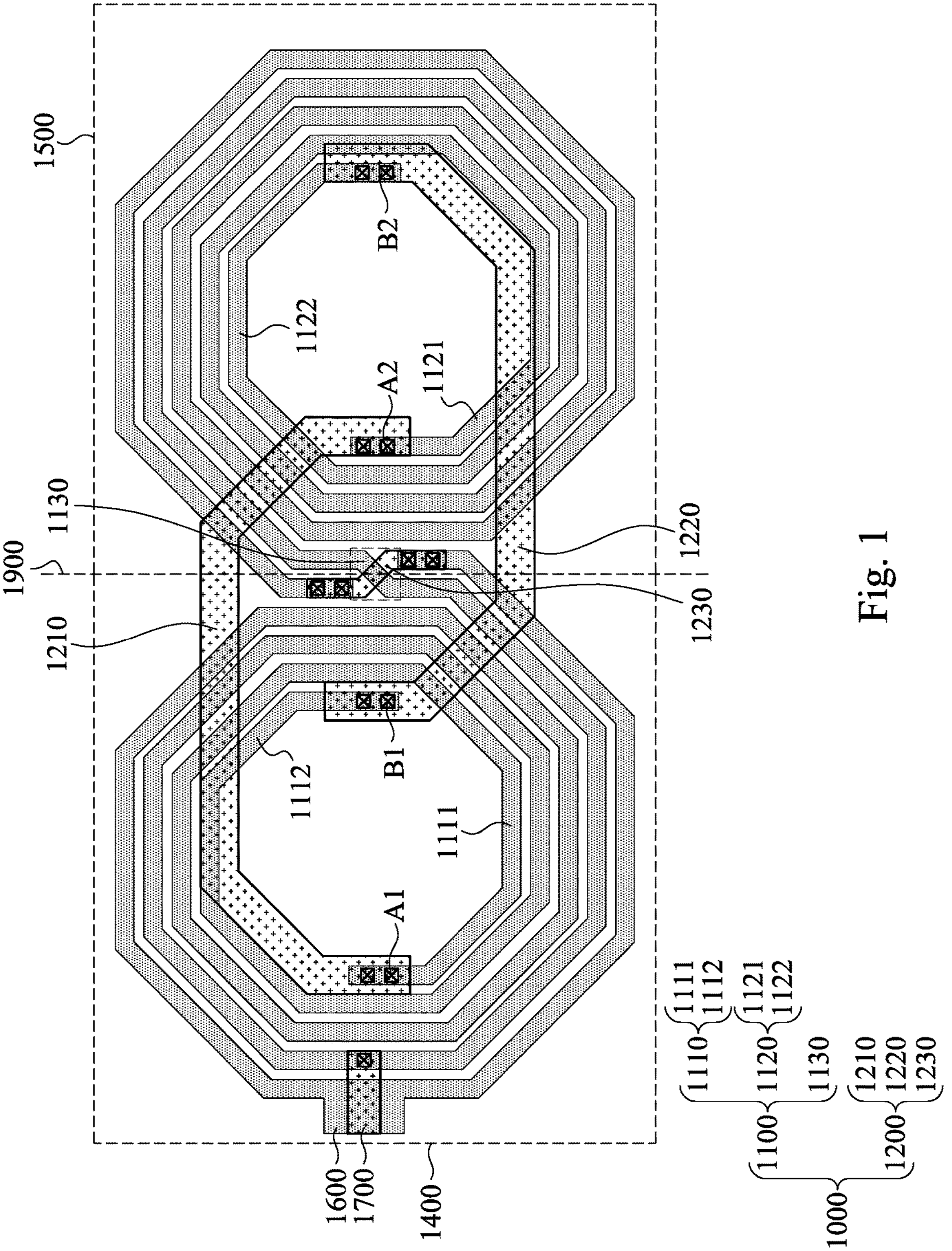
FIG. 1 depicts a diagram illustrating a stacked inductor device according to some embodiments of the present disclosure.

The technical terms "first", "second" and the similar terms are used to describe elements for distinguishing the same or similar elements or operations and are not intended to limit the technical elements and the order of the operations in the present disclosure. Furthermore, the element symbols/alphabets can be used repeatedly in each embodiment of the present disclosure. The same and similar technical terms can be represented by the same or similar symbols/alphabets in each embodiment. The repeated symbols/alphabets are provided for simplicity and clarity and they should not be interpreted to limit the relation of the technical terms among the embodiments.

Reference will now be made in detail to the present embodiments of the disclosure, examples of which are illustrated in the accompanying drawings. Wherever possible, the same reference numbers are used in the drawings and the description to refer to the same or like parts.

Reference is made to FIG. 1. FIG. 1 depicts a diagram illustrating a stacked inductor device 1000 according to some embodiments of the present disclosure. As shown in FIG. 1, the stacked inductor device 1000 includes an 8-shaped inductor structure 1100 and a stacked coil 1200. The 8-shaped inductor structure 1100 includes a first coil 1110 and a second coil 1120. The first coil 1110 is disposed in a first area 1400. The second coil 1120 is disposed in a second area 1500. The first area 1400 is adjacent to the second area 1500 by a boundary 1900. The second coil 1120 is coupled with the first coil 1110 on the boundary 1900 between the first area 1400 and the second area 1500. The first coil 1110 includes a first sub-coil 1111 and a second sub-coil 1112. The first sub-coil 1111 and the second sub-coil 1112 are disposed with an interval circularly with each other to form a large coil. The second coil 1120 includes a third sub-coil 1121 and a fourth sub-coil 1122. The third sub-coil 1121 and a fourth sub-coil 1122 are disposed with an interval circularly with each other to form a large coil.

In some embodiments, the first sub-coil 1111 is coupled to the fourth sub-coil 1122 through a connector 1230. The second sub-coil 1112 is coupled to the third sub-coil 1121 through a crossing portion 1130.

The stacked coil 1200 stacks partially on or under the 8-shaped inductor structure 1100 in a top-view direction. The stacked coil 1200 includes a first wire 1210 and a second wire 1220. In the top-view direction of the stacked inductor device 1000, a first terminal of the first wire 1210 and a first terminal of the first sub-coil 1111 are coupled at a connection point A1 through a vertical connector (e.g., a via). A second terminal of the first wire 1210 and a first terminal of the third sub-coil 1121 are coupled at a connection point A2 through a vertical connector. A first terminal of the second wire 1220 and a first terminal of the second sub-coil 1112 are coupled at a connection point B1 through a vertical connector. A second terminal of the second wire 1220 and the fourth sub-coil 1122 are coupled at a connection point B2 through a vertical connector. In this way, the first wire 1210 and the second wire 1220 cross between the first coil 1110 and the second coil 1120 to partially stack on or under the first coil 1110 and the second coil 1120 in top-view direction. The disclosure is not limited to the connection type and any connection type based on practical demands belongs to the scope of the disclosure.

In some embodiments, the first wire 1210 and the second wire 1220 are two times the width of the first coil 1110 and the second coil 1120. Therefore, the resistance value of the stacked coil 1200 can be reduced and the inductance value of the stacked inductor device 1000 is increased.

The stacked inductor device 1000 includes an input terminal 1600 and a center-tap terminal 1700. In some embodiments, the input terminal 1600 is coupled to the first sub-coil 1111. The center-tap terminal 1700 is coupled to the second sub-coil 1112. The input terminal 1600 and the center-tap terminal 1700 are disposed on a side of the first area 1400 in a reverse side of the boundary 1900 (e.g., the left side of the first area 1400).

In some embodiments, the first coil 1110 and the second coil 1120 are oblique symmetric with each other based on the boundary 1900. For example, the first coil 1110 is flipped over (e.g., the upside-down of 180 degrees flipping) and an inverted structure of the first coil 1110 is symmetric with the second coil 1120 based on the boundary 1900 (or after the first coil 1110 is flipped upside-down and horizontally flipped, the inverted structure of the first coil 1110 is the same with the second coil 1120). The first sub-coil 1111 and the fourth sub-coil 1122 are oblique symmetric with each other based on the boundary 1900. For example, the inverted structure of the first sub-coil 1111 (e.g., the upside-down of 180 degrees flipping) is symmetric with the fourth sub-coil 1122 based on the boundary 1900 (or after the first sub-coil 1111 is flipped upside-down and horizontally flipped, the inverted structure of the first sub-coil 1111 is the same with the fourth sub-coil 1122). The second sub-coil 1112 and the third sub-coil 1121 are oblique symmetric with each other based on the boundary 1900. For example, the inverted structure of the second sub-coil 1112 (e.g., the upside-down of 180 degrees flipping) is symmetric with the third sub-coil 1121 based on the boundary 1900 (or after the second sub-coil 1112 is flipped upside-down and horizontally flipped, the inverted structure of the second sub-coil 1112 is the same with the third sub-coil 1121).

Figure 2:
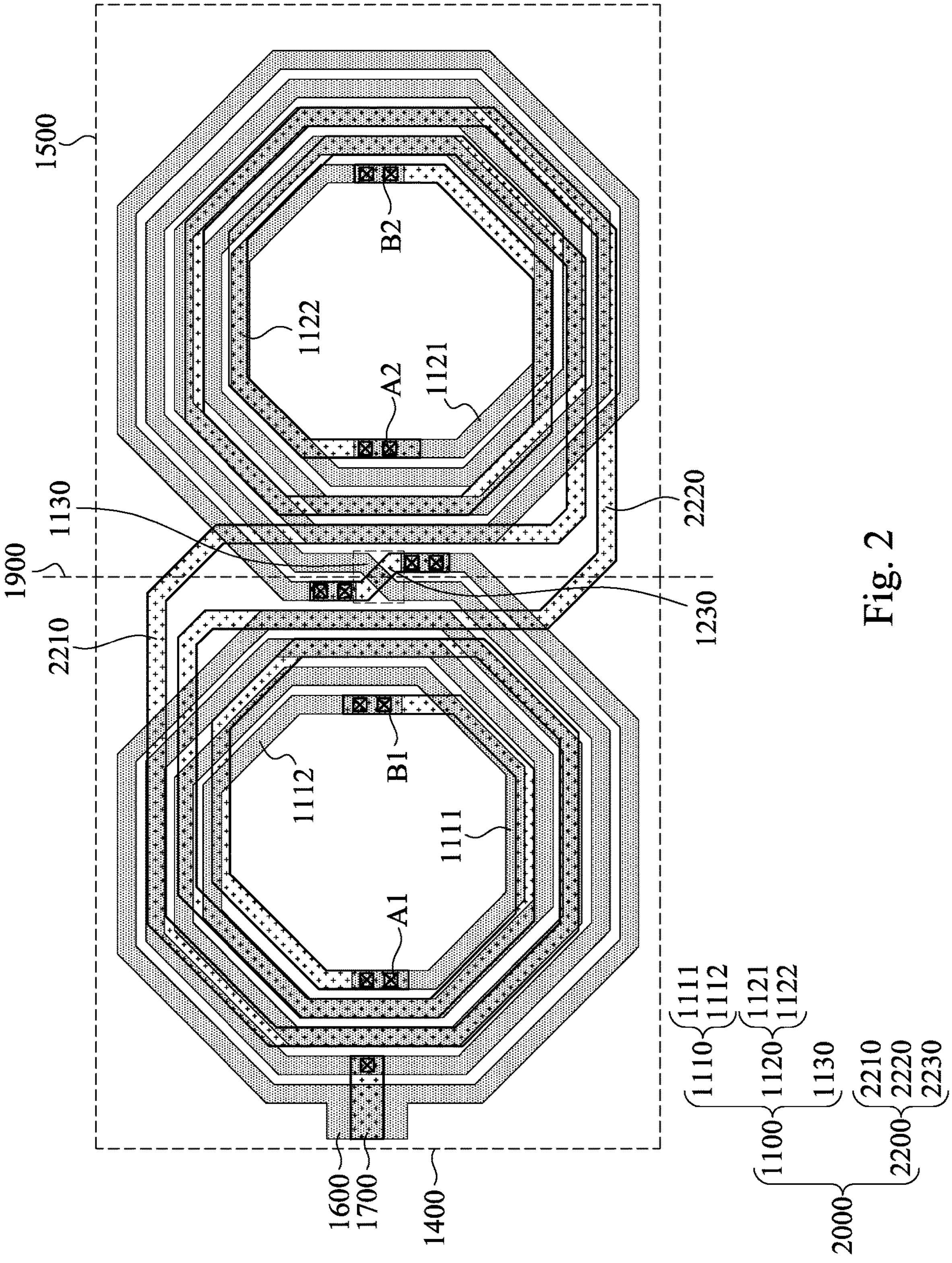
FIG. 2 depicts a diagram illustrating a stacked inductor device according to some embodiments of the present disclosure.

Reference is made to FIG. 2. FIG. 2 depicts a diagram illustrating a stacked inductor device 2000 according to some embodiments of the present disclosure. The elements which are shown in FIG. 2, whose numbers are the same as the numbers of the elements shown in FIG. 1, have the same functions, connections, or related descriptions in connection with those elements shown in FIG. 1, and the functions, connections, or related descriptions regarding the elements shown in FIG. 2 will be omitted here for the sake of brevity.

As shown in FIG. 2, the stacked inductor device 2000 includes an 8-shaped inductor structure 1100 and a stacked coil 2200. The stacked coil 2200 stacks partially on or under the 8-shaped inductor structure 1100 in a top-view direction.

The stacked coil 2200 includes a third coil 2210 and a fourth coil 2220. In the top-view direction of the stacked inductor device 2000, a first terminal of the third coil 2210 and a first terminal of the first sub-coil 1111 are coupled at the connection point A1 through the vertical connector (e.g., a via). A second terminal of the third coil 2210 and a first terminal of the third sub-coil 1121 are coupled at the connection point A2 through a vertical connector. A first terminal of the fourth coil 2220 and a first terminal of the second sub-coil 1112 are coupled at the connection point B1 through a vertical connector. A second terminal of the fourth coil 2220 and a first terminal of the fourth sub-coil 1122 are coupled at the connection point B2 through a vertical connector. Therefore, the third coil 2210 and the fourth coil 2220 cross between the first coil 1110 and the second coil 1120 to partially overlap with the first coil 1110 and the second coil 1120 in the top-view direction. In some embodiments, the third coil 2210 and the fourth coil 2220 are disposed with an interval with each other.

In some embodiments, the third coil 2210 and the fourth coil 2220 are oblique symmetric based on the boundary 1900.

Figure 3:
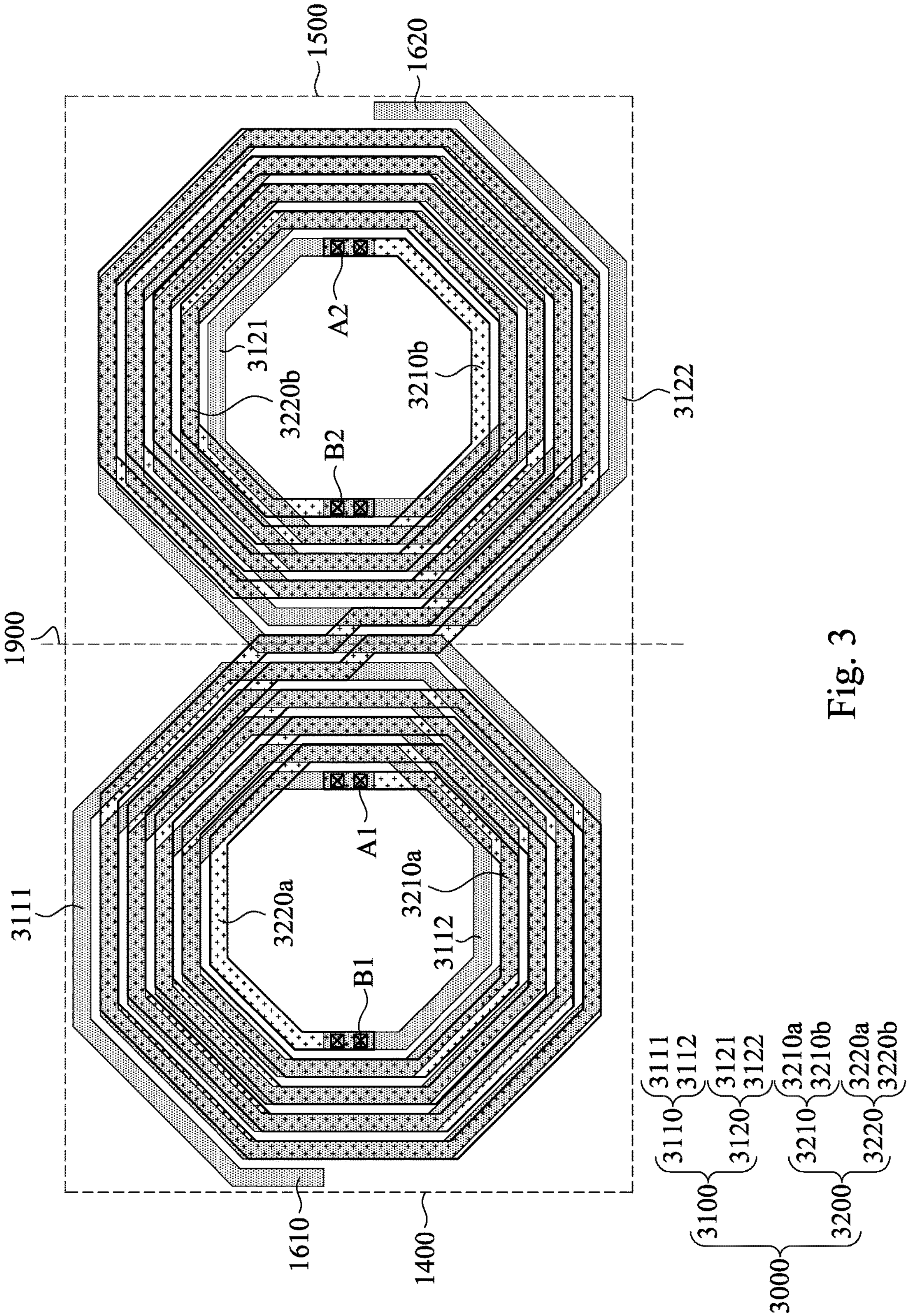
FIG. 3 depicts a diagram illustrating a stacked inductor device according to some embodiments of the present disclosure.

Reference is made to FIG. 3. FIG. 3 depicts a diagram illustrating a stacked inductor device 3000 according to some embodiments of the present disclosure. For the sake of understanding with ease, the stacked inductor device 3000 in FIG. 3 includes an 8-shaped inductor structure 3100 of FIG. 4 and a stacked coil 3200 of FIG. 5.

Figure 4:
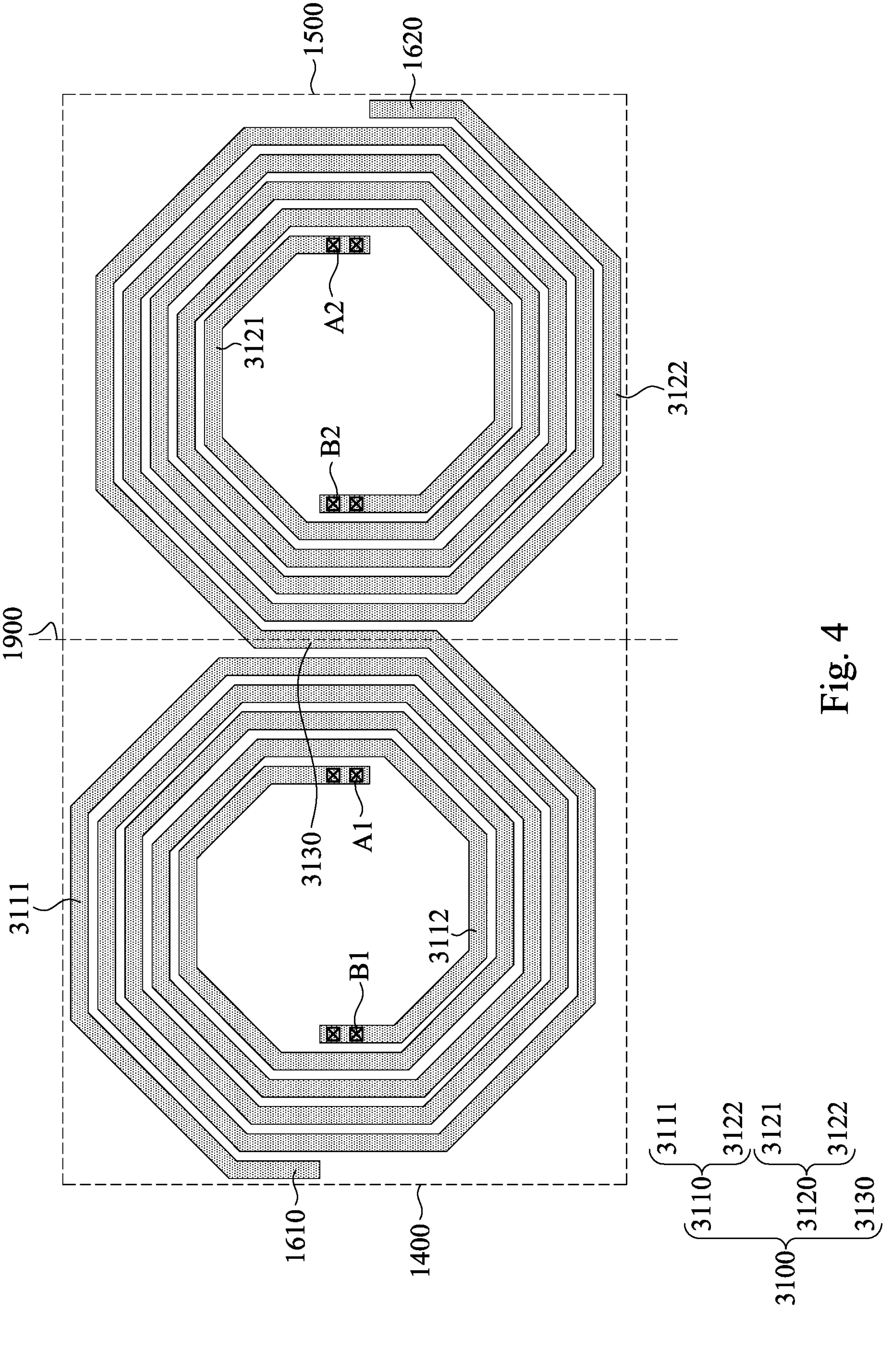
FIG. 4 depicts a diagram illustrating an 8-shaped inductor structure of the stacked inductor device in FIG. 3 according to some embodiments of the present disclosure.

Reference is made incorporating with FIG. 3 and FIG. 4. The 8-shaped inductor structure 3100 includes a first coil 3110 and a second wire 3120. The first coil 3110 is disposed in the first area 1400. The second wire 3120 is disposed in the second area 1500. The first coil 3110 includes a first sub-coil 3111 and a second sub-coil 3112. The first sub-coil 3111 and the second sub-coil 3112 are disposed with an interval circularly with each other to form a large coil. The second wire 3120 includes a third sub-coil 3121 and a fourth sub-coil 3122. The third sub-coil 3121 and the fourth sub-coil 3122 are disposed with an interval circularly with each other to form a large coil.

Reference is made to FIG. 4. The second sub-coil 3112 and the third sub-coil 3121 are coupled through a connecting line 3130. In some embodiments, the second sub-coil 3112, the third sub-coil 3121, and the connecting line 3130 is an integral unity coil.

Figure 5:
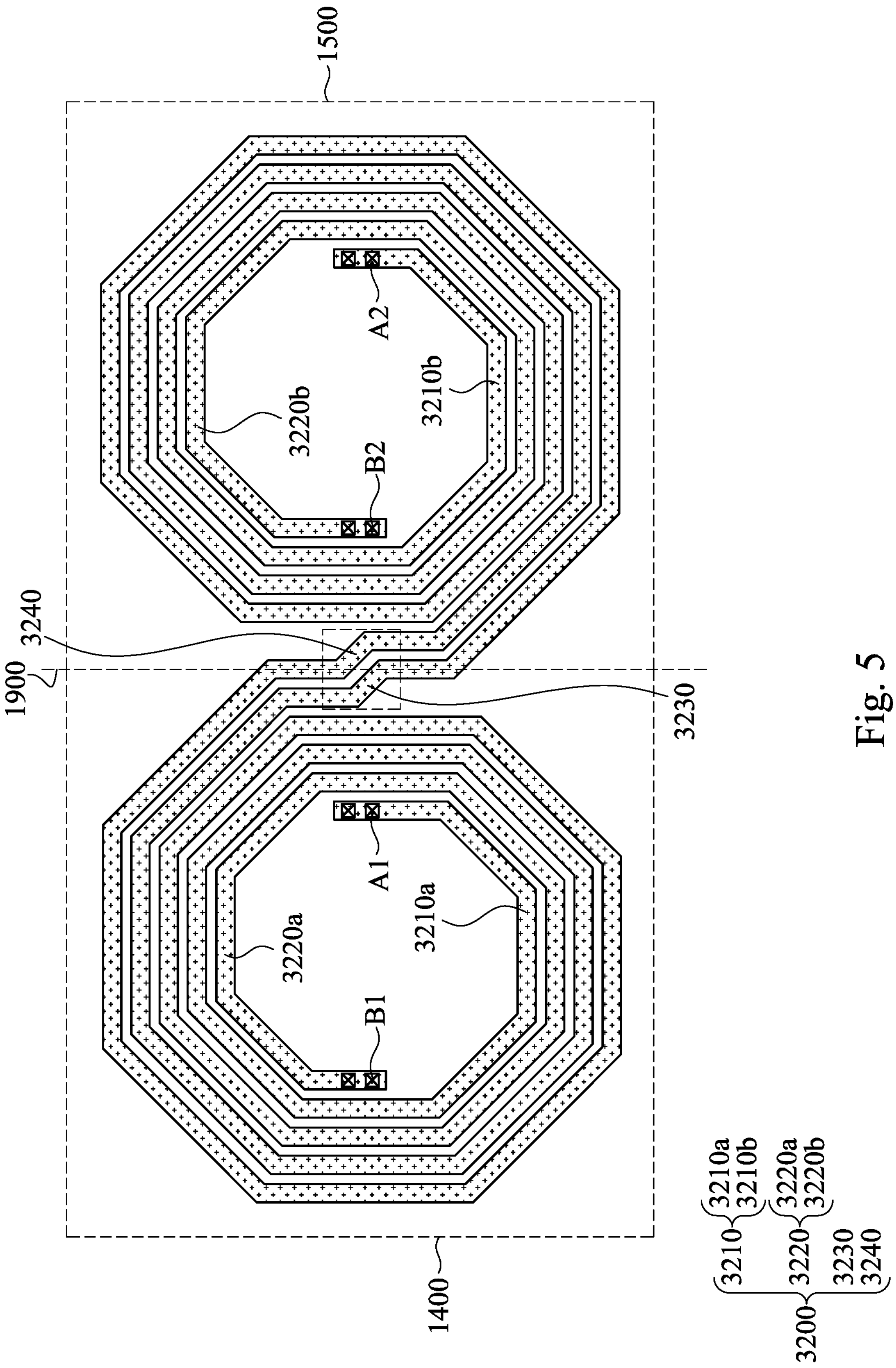
FIG. 5 depicts a diagram illustrating a stacked coil of the stacked inductor device in FIG. 3 according to some embodiments of the present disclosure.

Reference is made incorporating with FIG. 3 and FIG. 5. The stacked coil 3200 includes a first double-spiral coil 3210 and a second double-spiral coil 3220. In some embodiments, the first double-spiral coil 3210 and the second double-spiral coil 3220 are disposed with an interval with each other.

The first double-spiral coil 3210 includes two spiral coils, for example, a spiral coil **3210*a* and a spiral coil 3210*b*. The spiral coil 3210*a* and the spiral coil 3210*b* are coupled with each other through a connecting line 3230. Similarly, the second double-spiral coil 3220 includes two spiral coils, for example, a spiral coil 3220*a* and a spiral coil 3220*b***.

Reference is made to FIG. 5. The spiral coil **3220*a* and the spiral coil 3220*b* are coupled with each other through a connecting line 3240. In some embodiments, the spiral coil 3210***a*, the spiral coil 3210*b*, and the connecting line 3230 is an integral unity coil. The spiral coil 3220*a*, the spiral coil 3220*b*, and the connecting line 3240 is an integral unity coil.

Reference is made to FIG. 3 to FIG. 5. In the top-view direction of the stacked inductor device 3000, a first terminal of the first double-spiral coil 3210 and a first terminal of the first sub-coil 3111 are coupled at the connection point A1 through a vertical connector (e.g., a via). A second terminal of the first double-spiral coil 3210 and a first terminal of the third sub-coil 3121 are coupled at the connection point A2 through a vertical connector. A first terminal of the second double-spiral coil 3220 and a first terminal of the second sub-coil 3112 are coupled at the connection point B1 through a vertical connector. A second terminal of the second double-spiral coil 3220 and a first terminal of the fourth sub-coil 3122 are coupled at the connection point B2 through a vertical connector. In this way, the first double-spiral coil 3210 and the second double-spiral coil 3220 approximately overlap in the range of the first coil 3110 and the second wire 3120 to stack on or under the first coil 3110 and the second wire 3120.

In some embodiments, the 8-shaped inductor structure 3100 has an oblique symmetric structure based on the boundary 1900. The stacked coil 3200 has an oblique symmetric structure based on the boundary 1900.

Reference is made to FIG. 3. The stacked inductor device 3000 includes a first input terminal 1610 and a second input terminal 1620. The first input terminal 1610 is coupled to the second terminal of the second sub-coil 3112. The second terminal of the second sub-coil 3112 is disposed on one side of the first area 1400 in a reverse side of the boundary 1900, for example, the left side. The second input terminal 1620 is coupled to the second terminal of the third sub-coil 3121. The second terminal of the third sub-coil 3121 is disposed on one side of the second area 1500 in a reverse side of the boundary 1900, for example, the right side. The stacked inductor device 3000 includes a center-tap terminal (not shown in the figure). In some embodiments, the center-tap terminal is coupled between two spiral coils 3210*a* and 3210*b* of the first double-spiral coil 3210 and two spiral coils 3220*a* and 3220*b* of the second double-spiral coil 3220. For example, the center-tap terminal is coupled to the connecting line 3230 and/or the connecting line 3240 and extended parallel to the boundary 1900 upwards or downward.

Reference is made to FIG. 3 again, in some embodiments, the first coil 3110 and the second wire 3120 are located at a first layer, the stacked coil 3200 is located at a second layer, and the first layer is different from the second layer.

Figure 6:
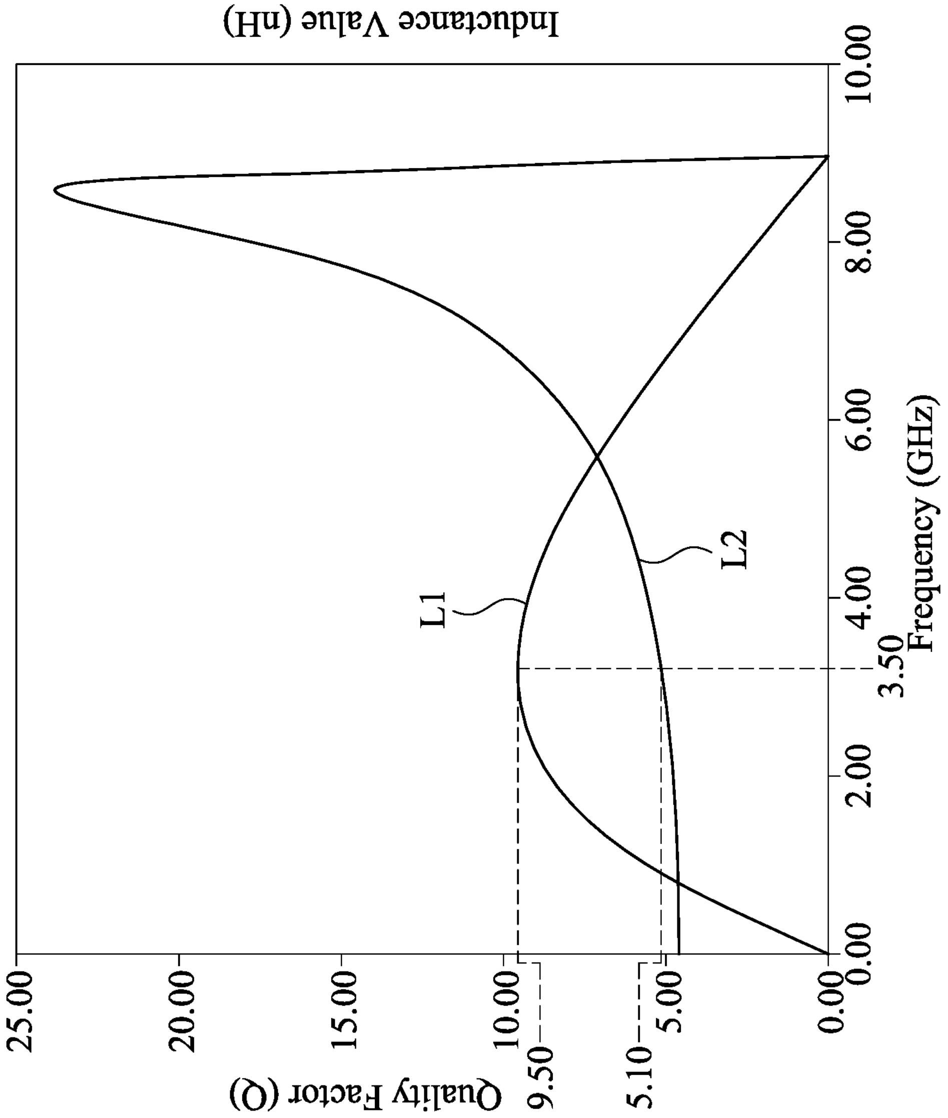
FIG. 6 depicts an experimental data diagram of a stacked inductor device according to some embodiments of this disclosure.

Reference is made to FIG. 6. FIG. 6 depicts an experimental data diagram of a stacked inductor device according to some embodiments of this disclosure. The experimental data shows a quality factor (Q) and an inductance value of the stacked inductor device 1000 in different frequencies. The curve L1 is the quality factor curve of the stacked inductor device 1000. The curve L2 is the inductance value curve of the stacked inductor device 1000. The area of the stacked coil of the stacked inductor device 1000 is small (relative to the stacked inductor devices 2000 and 3000). The stacked inductor device 1000 adopting the structure of the present disclosure has better inductance value at high temperatures. As shown in FIG. 6, at 80 degrees Celsius of operation degrees, and at 3.5 GHz frequency, the inductance value is about 5 nH and the quality factor is about 9.5. If the indoor temperature is about 80 degrees Celsius, the quality factor can be increased to about 11.

Figure 7:
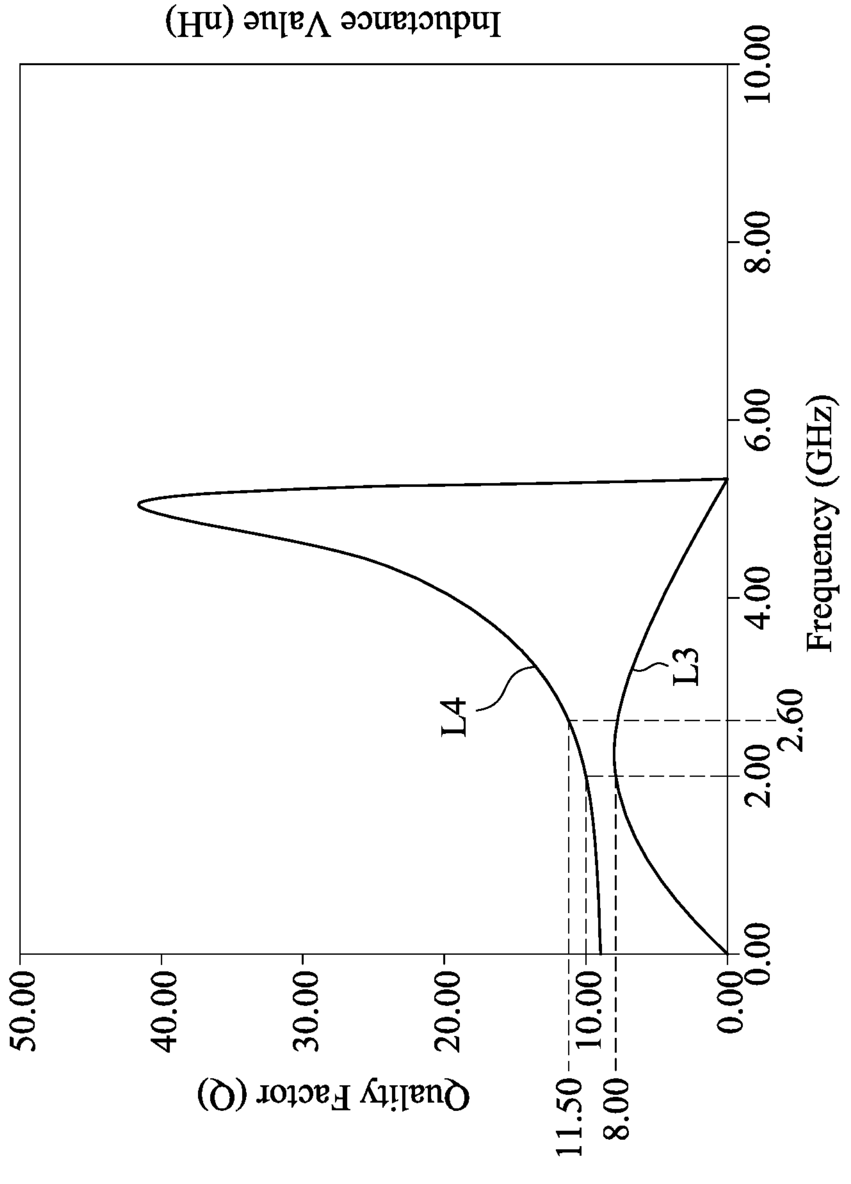
FIG. 7 depicts an experimental data diagram of a stacked inductor device according to some embodiments of this disclosure.

Reference is made to FIG. 7. FIG. 7 depicts an experimental data diagram of a stacked inductor device according to some embodiments of this disclosure. The experimental data shows a quality factor (Q) and an inductance value of the stacked inductor device 2000 in different frequencies. The curve L3 is the quality factor curve of the stacked inductor device 2000. The curve L4 is the inductance value curve of the stacked inductor device 2000. When the area of the stacked coil of the stacked inductor device 2000 is increased slightly (relative to the stacked inductor device 1000), at 2.6 GHz frequency, the inductance value is about to 11.5 nH. On the other hand, at 2 GHz frequency, the inductance value is about 10 nH, and the quality factor is about 8.

Figure 8:
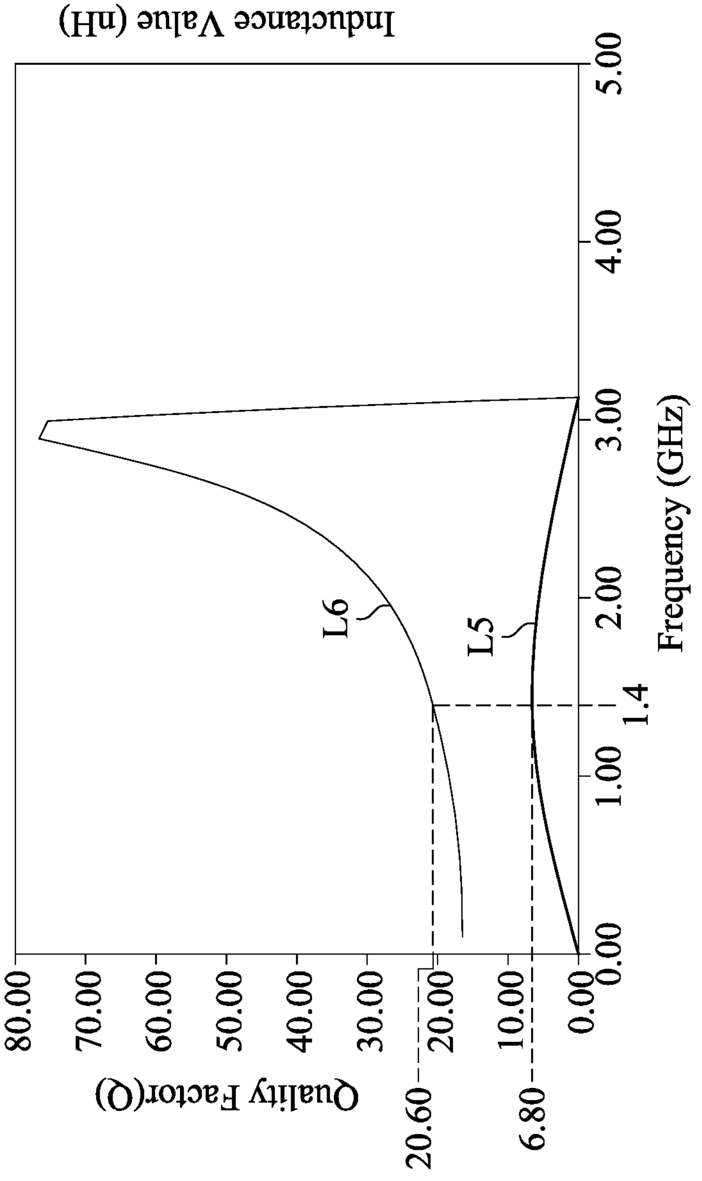
FIG. 8 depicts an experimental data diagram of a stacked inductor device according to some embodiments of this disclosure.

Reference is made to FIG. 8. FIG. 8 depicts an experimental data diagram of a stacked inductor device according to some embodiments of this disclosure. The experimental data shows a quality factor (Q) and an inductance value of the stacked inductor device 3000 in different frequencies. The curve L5 is the quality factor curve of the stacked inductor device 3000. The curve L6 is the inductance value curve of the stacked inductor device 3000. The area of the stacked coil of the stacked inductor device 3000 is large (relative to the stacked inductor devices 1000 and 2000). At frequency 1.4 GHz, the inductance value is about 20.6 nH, and the quality factor is about 6.8. On the other hand, at the frequency 0.1 GHz, the inductance value is about 16.6 nH such that the high inductance value can also be achieved at low frequency.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A stacked inductor device, comprising:
an 8-shaped inductor structure, comprising:
a first coil disposed in a first area, wherein the first coil comprises a first sub-coil and a second sub-coil, and the first sub-coil and the second sub-coil are disposed with an interval with each other; and
a second coil disposed in a second area, wherein the second coil comprises a third sub-coil and a fourth sub-coil, the third sub-coil and the fourth sub-coil are disposed with an interval with each other, wherein a second terminal of the first sub-coil is coupled to a second terminal of the fourth sub-coil on a boundary between the first area and the second area, and a second terminal of the second sub-coil is coupled to a second terminal of the third sub-coil on the boundary; and
a stacked coil coupled to the first coil and the second coil and stacked partially on or under the first coil and the second coil, wherein the stacked coil comprises:
a first wire, wherein a first terminal of the first wire is coupled to a first terminal of the first sub-coil, and a second terminal of the first wire is coupled to a first terminal of the third sub-coil; and
a second wire, wherein a first terminal of the second wire is coupled to a first terminal of the second sub-coil, and a second terminal of the second wire is coupled to a first terminal of the fourth sub-coil.

2. The stacked inductor device of claim 1, wherein an inverted structure of the first coil is symmetric with the second coil based on the boundary.

3. The stacked inductor device of claim 1, wherein the first wire and the second wire are two times the width of the first coil and the second coil.

4. The stacked inductor device of claim 1, further comprising a connector, wherein the connector is coupled to the second terminal of the first sub-coil and the second terminal of the fourth sub-coil.

5. The stacked inductor device of claim 1, wherein the 8-shaped inductor structure is coupled to a crossing portion on the boundary with an interlaced manner.

6. The stacked inductor device of claim 1, further comprising:

an input terminal coupled to the 8-shaped inductor structure; and a center-tap terminal coupled to the 8-shaped inductor structure;

wherein the input terminal and the center-tap terminal are disposed on a side of the first area which is in a reverse side of the boundary.

7. The stacked inductor device of claim 1, wherein an inverted structure of the first sub-coil is symmetric with the fourth sub-coil based on the boundary.

8. The stacked inductor device of claim 1, wherein an inverted structure of the second sub-coil is symmetric with the third sub-coil are based on the boundary.

* * * * *